A. T. SCANNELL.
MECHANICAL HOIST FOR MOTOR VEHICLES.
APPLICATION FILED JULY 30, 1917.
1,307,154.
Patented June 17, 1919.
2 SHEETS—SHEET 1.
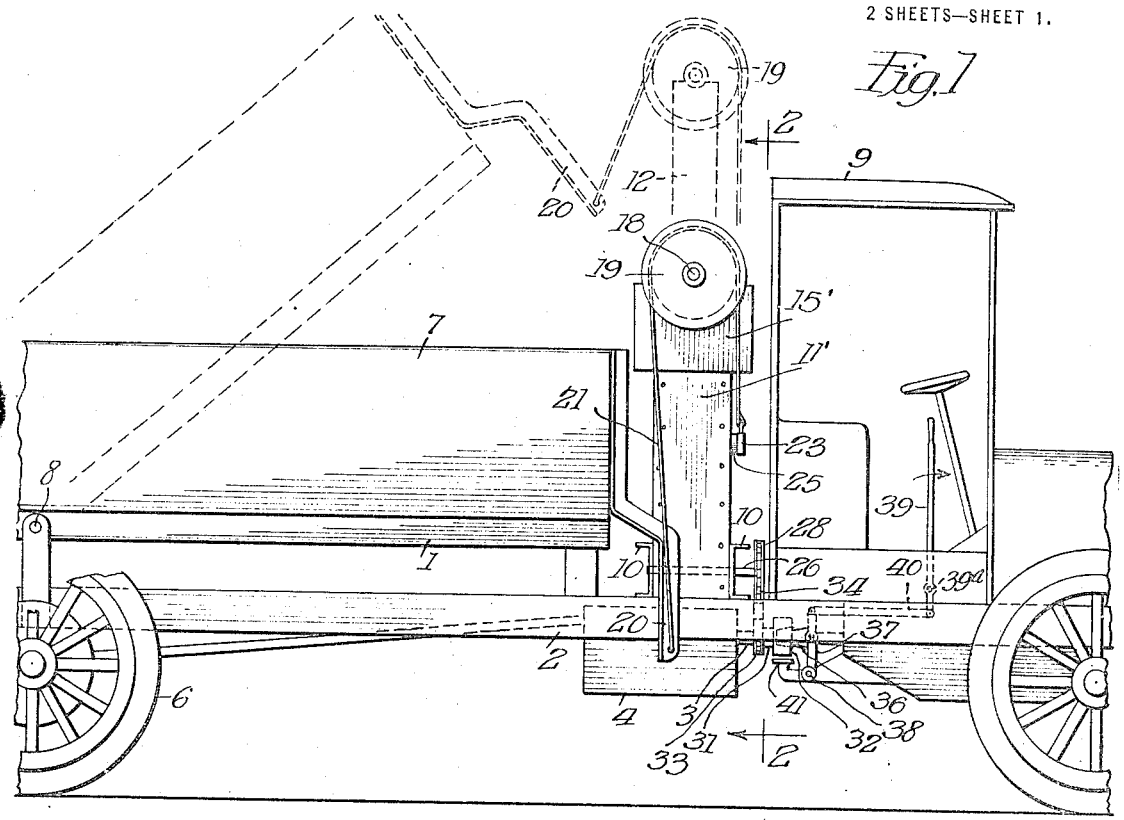
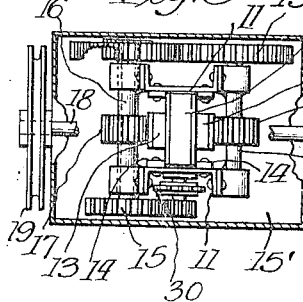
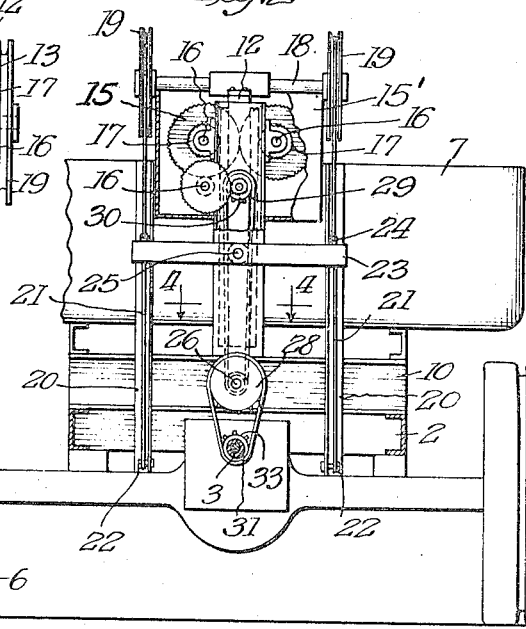
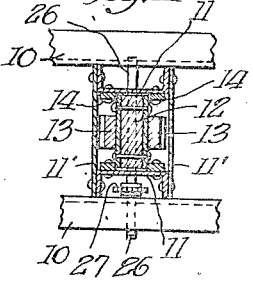
Inventor
Albert T. Scannell
By George Bayard Jones
Atty A. T. SCANNELL.
MECHANICAL HOIST FOR MOTOR VEHICLES.
APPLICATION FILED JULY 30, 1917.
1,307,154.
Patented June 17, 1919.
2 SHEETS—SHEET 2.
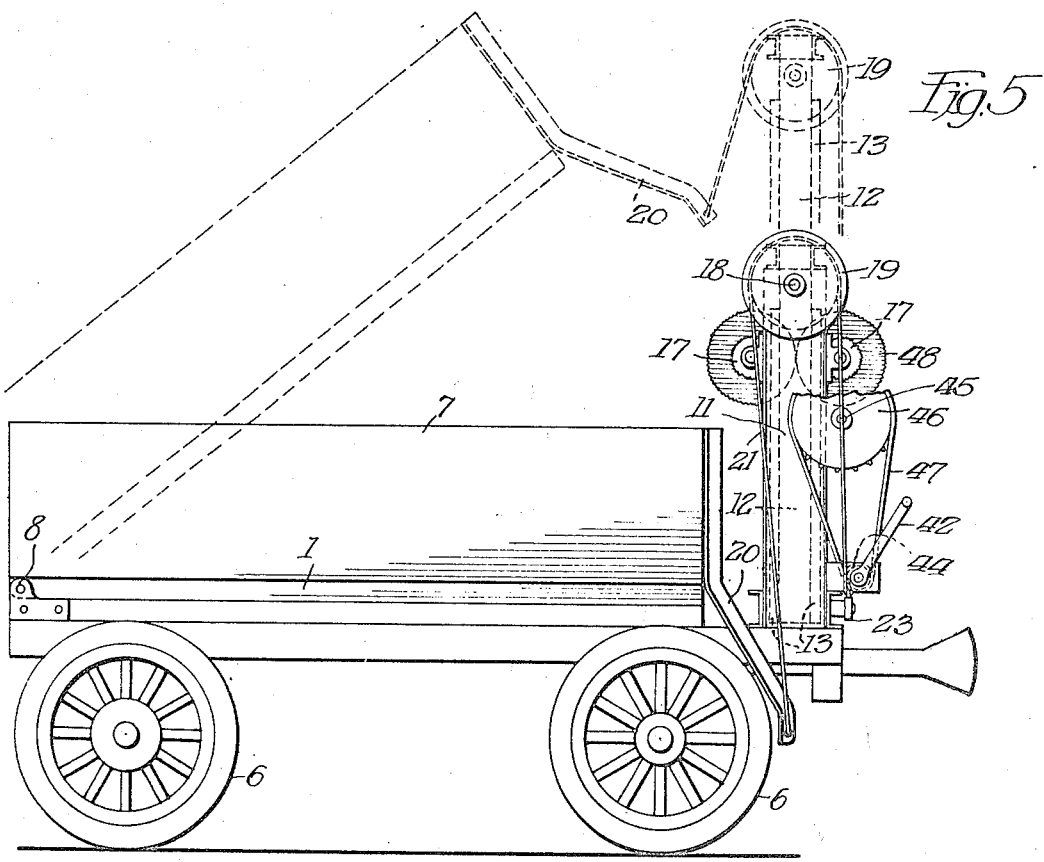
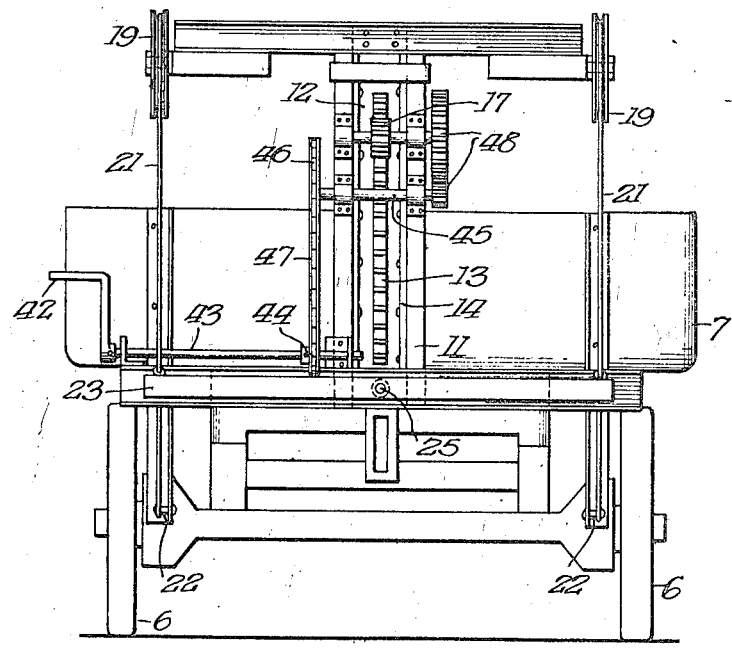
Inventor
Albert T. Scannell
By George Bayard Jones
Atty

UNITED STATES PATENT OFFICE.

ALBERT T. SCANNELL, OF CHICAGO, ILLINOIS.

MECHANICAL HOIST FOR MOTOR-VEHICLES.

1,307,154.      Specification of Letters Patent.      Patented June 17, 1919.

Application filed July 30, 1917. Serial No. 183,431.

*To all whom it may concern:*

Be it known that I, ALBERT T. SCANNELL, citizen of the United States, residing at Chicago, in the county of Cook and State of Illinois, have invented a certain new and useful Improvement in Mechanical Hoists for Motor-Vehicles, of which the following is a full, clear, concise, and exact description.

This invention relates to mechanical hoists and more particularly to hoists of the type adapted for use in connection with motor trucks and trailers for the purpose of tilting the bodies thereof to thereby quickly dump the contents of the same.

One object of the invention is to provide a hoist of this type which shall be adapted to be operated by power derived from the power plant of the motor truck on which it is mounted or by manual power in the event the hoist is applied to a trailer, to thereby effect a tilting of the body thereof and a dumping of its contents.

Another object of the invention is to provide a hoist of the type described which shall be simple in construction and operation and economical to manufacture and one wherein the power transmitting mechanism is completely housed thereby protecting it from dirt, grit, and other foreign substances, while at the same time a very neat and compact arrangement is provided.

A further object is to provide an improved combination clutch and brake for use in connection with said hoist whereby said brake is released when the hoisting mechanism is thrown into driving engagement with the power plant of the automobile and applied when said mechanism is disconnected therefrom.

Other objects and advantages will be apparent from the following description taken in connection with the accompanying drawings wherein two embodiments of the invention are illustrated:

Figure 1 is a side elevation of a truck provided with a hoist constructed in accordance with the present invention.

Fig. 2 is a section taken on the line 2—2 of Fig. 1.

Fig. 3 is a top plan view of the hoist with parts thereof removed.

Fig. 4 is a section on the line 4—4 of Fig. 2.

Fig. 5 is a side elevation of a trailer provided with a hoist of slightly modified construction, and Fig. 6 is a front elevation thereof.

Referring more in detail to the drawings, an automobile truck is illustrated at 1 and may be of any preferred type, said truck being shown provided with the usual frame 2, the engine shaft 3 which projects rearwardly from the power plant (not shown) of the automobile the said power plant being housed in the usual manner at the forepart thereof. At 4 is illustrated the housing of the speed change mechanism which transmits power at variable speeds from the engine shaft 3 to the rear wheels 6 of the vehicle. Mounted on the frame 2 is shown a dumping body 7 preferably pivoted at the rear of the automobile as shown at 8 whereby said body may be tilted upwardly substantially as shown in dotted lines in Fig. 1 to thereby discharge the contents of the same. The hoist is preferably mounted on the frame 2 of the vehicle intermediate the forward end of the body 7 and the cab 9 thereof, said hoist being shown mounted on a plurality of transverse channel beams 10 secured in any suitable manner to the frame 2 of the vehicle. The hoist as shown comprises a plurality of upright channel beams 11 bolted or otherwise secured to the transverse channel beams 10, said channel beams 11 being spaced apart substantially as shown in order to provide a clearance therebetween for the reception of a rectangular beam 12, said beam 12 being provided with a plurality of racks 13, one disposed on each face thereof. The beam 12 is held in position between the channel beams 11 by means of suitable retaining strips 14 shown bolted to the inner faces of the beams 11 and adapted to form guides for said rectangular beam 12 as the same is raised and lowered in the manner hereinafter pointed out. This double rack and pinion construction, it will be noted, also provides means whereby the power utilized in raising the beam is more evenly distributed than in hoists where only one pinion is used.

Suitable reduction gears are illustrated at 15 and are shown mounted on shafts 16 which are suitably journaled to the upright beams 11. This reduction gearing 15 is housed within a suitable box 15' and is adapted to transmit power from the power plant of the automobile, in a manner as hereinafter pointed out, to the small pinions 17 which mesh with the racks 13 mounted on the opposite faces of the beam 12, said pinions serving as means whereby said beam 12 may be raised to any desired height to effect a tilting of the body 7 and a quick discharge of the contents thereof. Suitable plates 11' are preferably bolted to the flanges of the beams 11, substantially as shown, in order to form a housing for the beam 12 and its racks 13 and to thereby protect it from dust, grit and other foreign substances which might interfere with its successful operation. A transverse shaft 18 is shown mounted at the upper end of the beam 12 and is adapted to be raised and lowered therewith. On opposite ends of the shaft 18 are mounted suitable pulleys 19. The body 7 is provided with depending arms 20 at its inner end, said arms being preferably in the form of angle irons and adapted to receive the ends of cables 21 which are attached to the lower ends of said arms 20 by means of pivots 22, said cables passing from thence up over the pulleys 19 and down to the equalizing cross beam 23, to the opposite ends of which they are attached by means of pivots 24. The cross beam 23 is anchored to one of the upright channel beams 11 at 25, said anchor being in the form of a pivot whereby said cross beam 23 may oscillate in order to equalize the pull exerted by the hoist on the lower ends of the arms 20 when the body 7 is being tilted. In other words, the pivoted cross beam 23 is provided in order that the lifting power of the hoist will be equally distributed between the two points of application thus obviating the possibility of the power being unequally distributed or of it all being exerted on only one or the other of the arms 20. Extending through the transverse channel beams 10 and journaled therein in some suitable manner is the shaft 26 provided with sprocket wheels 27 and 28 rigidly secured thereto and adapted to rotate therewith. A drive chain 29 connects the sprocket wheel 27 to the sprocket wheel 30 which forms a part of the reduction gearing 15 whereby power may be transmitted from the shaft 26 through said reduction gearing to the pinions 17 to thereby raise the beam 12. The sprocket wheels 27 and 30 together with their connecting drive chain 29, it will be noted, operate within the channel of one of the upright beams 11. Loosely mounted on the engine shaft 3 is a sleeve 31 provided at one end thereof with a brake drum 32 and at its other end with a sprocket wheel 33 adapted to drive the sprocket wheel 28 and accordingly the shaft 26 on which said sprocket wheel is mounted, by means of a suitable drive chain 34. A clutch 36 of any preferred type is shown keyed to the shaft 3, said clutch being adapted to be moved into engagement with the inner periphery of the brake drum 32 to thereby lock the sleeve 31 for rotation with the shaft 3 whereby power from the automobile engine is transmitted to the shaft 26 and from thence to the hoisting mechanism driven thereby. The clutch 36 is preferably connected with and adapted to be operated by the brake arm 37 which is shown pivoted in any suitable manner at 38 and adapted to be operated by a suitable operating lever 39 pivoted at 39ª and connected to said brake arm 37 by means of a pivot link 40.

From this it will be noted that when it is desired to lock the sleeve 31 to the shaft 3, the operating lever 39 is moved in the direction of the arrow (Fig. 1) to thereby advance the clutch into engagement with the inner periphery of the drum 32. This movement of the operating lever 39 releases the brake shoe 41 from engagement with the brake drum 32 thereby permitting the sleeve 31 to turn with the shaft 3 by reason of the clutch engagement therewith, to thereby transmit the power derived from the engine of the truck to the sprocket wheel 28, which in turn drives the reduction gearing 15 by means of the sprocket wheel 27 and chain 29 and effects a raising of the rectangular beam 12 by virtue of the engagement of the pinions 17 with the racks 13. This, it will be noted, raises the pulleys 19 and effects a tilting of the body 7 whereby the contents thereof are quickly discharged. Whenever it is desired to stop the raising of the beam 12 and accordingly the tilting of the body of the vehicle, the operating lever 39 is moved in a direction opposite to that indicated by the arrow (shown in Fig. 1) whereby the clutch is disengaged and at the same time the brake shoe 41 is applied to the brake drum 32 thereby causing the sleeve 31 and the various elements connected therewith and driven thereby to be stopped.

In Figs. 5 and 6 is illustrated a slightly modified form of the invention wherein a crank 42 is provided whereby the hoist may be manually operated, the mechanism adapted to transmit power from the automobile engine shaft to the reduction gearing hereinbefore described being dispensed with. The form of invention illustrated in these figures is designed primarily for use in connection with trailers which, as is well known, are not provided with self-propelling means. Mounted on the crank shaft 43 is a suitable sprocket wheel 44 adapted to transmit motion from said shaft to the shaft 45 by means of the sprocket wheel 46 and drive chain 47. From this point the power is transmitted to the rectangular beam 12 through reduction gearing 48, substantially similar to the reduction gearing 15 illustrated and described in connection with the preferred embodiment of the invention. The remainder of the hoist construction together with its connections with the body of the vehicle is preferably the same as that described in connection with the form shown in Fig. 1, the main purpose of this modification being to provide a hoist which may be readily mounted on the forward end of a trailer and which may be manually operated in order to raise the body of said trailer on its pivot to thereby quickly discharge the contents thereof.

It is obvious that the truck shown in Fig. 1, may be provided with a manually operable hoist such as shown and described in connection with Figs. 5 and 6 of the drawings, if desired, instead of the hoist adapted to be operated by the power plant of the automobile.

Various other changes may also be made in the construction herein illustrated where not limited in the appended claims.

Having thus described my invention, what I claim as new and desire to secure by Letters Patent of the United States is:—

1. A body hoist for vehicles comprising a transverse member adapted to be mounted across the side members of the frame of a vehicle in advance of the body thereof, spaced apart uprights secured to said transverse member, a beam slidably mounted between said uprights, an operating shaft disposed adjacent the lower end of said slidable beam, means for transmitting power from said shaft to said beam to thereby raise the same, and means for transmitting such movement of said beam to said body.

2. A hoist for motor vehicles comprising a plurality of channel beams disposed on end, a member slidably mounted therebetween, reduction gearing for transmitting power from the engine shaft of the vehicle to said sliding member to effect a tilting of the body of said vehicle and plates secured to the flanges of said channel beams adapted to form a housing for said sliding member.

3. A hoist for motor vehicles comprising a plurality of transverse beams, uprights mounted thereon, a beam slidably mounted between said uprights, a shaft journaled in said transverse beams, means whereby said shaft may be driven by power derived from the engine of the vehicle, and means for transmitting said power from said shaft to said beam to thereby raise the same.

4. A hoist for motor vehicles comprising a plurality of spaced apart channel beams erected back to back in such manner that the channels thereof face outwardly, a member slidably mounted between said beams, reduction gearing for transmitting power from the engine shaft of the vehicle to said sliding member, a chain for driving said reduction gearing, said chain being mounted to travel in the channel of one of said beams whereby a housing is provided therefor, a housing for said reduction gearing and plates secured to the flanges of said channel beams to form a housing for said sliding member.

5. A hoist for motor vehicles comprising a plurality of spaced apart channel beams erected back to back, grooves provided in the opposing faces of said beams, a member slidably mounted in said grooves, means for transmitting motion from the engine shaft of the vehicle to said sliding member, and plates secured to the flanges of said channel beams to form a housing for said member.

6. A body hoist for motor vehicles comprising a plurality of substantially vertically disposed channel beams, a beam slidably mounted between said channel beams, a rack on one face of said slidable beam, a driving pinion supported on the flanges of said channel beams adjacent said rack and in mesh therewith, and means for driving said pinion by means of power derived from the power plant of the vehicle to actuate said beam.

In witness whereof I hereunto subscribe my name this 27th day of July A. D., 1917.

ALBERT T. SCANNELL.